(12) United States Patent
Steinberg

(10) Patent No.: US 7,199,719 B2
(45) Date of Patent: Apr. 3, 2007

(54) RFID TAG READER WITH TAG LOCATION INDICATED BY VISIBLE LIGHT BEAM

(76) Inventor: Dan Alan Steinberg, 2301 Glade Rd., Blacksburg, VA (US) 24060

( * ) Notice: Subject to any disclaimer, the term of this patent is extended or adjusted under 35 U.S.C. 154(b) by 132 days.

(21) Appl. No.: 11/089,990

(22) Filed: Mar. 24, 2005

(65) Prior Publication Data

US 2005/0212676 A1  Sep. 29, 2005

Related U.S. Application Data

(60) Provisional application No. 60/556,044, filed on Mar. 24, 2004.

(51) Int. Cl.
G08B 13/14 (2006.01)

(52) U.S. Cl. .............................. 340/572.8; 340/572.1; 340/825.49; 340/539.32

(58) Field of Classification Search ............. 340/10.41, 340/870.2, 573.1, 572.1, 572.4, 10.1, 572.8, 340/825.49, 539.32; 235/385
See application file for complete search history.

(56) References Cited

U.S. PATENT DOCUMENTS

| | | | |
|---|---|---|---|
| 5,382,784 A | | 1/1995 | Eberhardt |
| 5,874,724 A | | 2/1999 | Cato |
| 6,078,251 A | * | 6/2000 | Landt et al. ............. 340/10.41 |
| 6,150,942 A | * | 11/2000 | O'Brien .................... 340/573.1 |
| 6,195,006 B1 | * | 2/2001 | Bowers et al. ........... 340/572.1 |
| 6,232,870 B1 | * | 5/2001 | Garber et al. .............. 340/10.1 |
| 6,335,685 B1 | | 1/2002 | Schrott et al. |
| 2005/0212660 A1 | | 9/2005 | Hansen et al. |

* cited by examiner

Primary Examiner—Anh V. La
(74) Attorney, Agent, or Firm—Dan Steinberg, Patent Agent

(57) ABSTRACT

Provided are radiofrequency identification (RFID) tag readers having visible light beams to visually indicate the location of an RFID tag. In one embodiment, the RFID reader can electronically determine the location of an RFID tag. The RFID reader has a visible laser scanner that is controlled to target the RFID tag, based on the electronic location data. Hence, the user will see a laser beam point toward the RFID tag location. In another embodiment, the RFID tag reader has a directional RF interrogating beam, and a visible light beam that overlaps with the RF interrogating beam. The visible light beam indicates the volume of space where the RFID tag reader can detect RFID tags. The size of the visible light beam can be adjusted to be bigger for more sensitive tags (e.g. active tags) or smaller for less sensitive tags. (e.g. passive tags), or adjusted for RF output power.

14 Claims, 4 Drawing Sheets

RFID TAG READER WITH TAG LOCATION INDICATED BY VISIBLE LIGHT BEAM

RELATED APPLICATIONS

The present application claims the benefit of priority from now abandoned provisional application No. 60/556,044, filed on Mar. 24, 2004.

FIELD OF THE INVENTION

The present invention relates generally to radio frequency identification (RFID) tag readers. More particularly, it relates to an RFID tag reader that uses a light beam to indicate the location of an RFID tag, or indicate where the RFID reader is projecting an interrogating RF beam.

BACKGROUND OF THE INVENTION

Radiofrequency identification (RFID) tags are well known in the art. RFID tags are small electronic circuits that respond with a data-carrying RF reply signal when interrogated with an RF signal at a particular frequency. Tags are either passive or active. Passive tags rely on the energy of the interrogation signal to generate the reply signal; active tags carry their own battery. Active tags have a much longer range than active tags. Active tags typically can be queried up to about 150 feet distant; passive tags typically can be queried up to about 10 or 20 feet distant. In recent years, the maximum range of both passive and active tags has been increased by technological advancements in the field.

RFID tags are expected to have a large number of applications in many settings to track and store materials and inventory. Libraries, hospitals, warehouses, retail stores, manufacturing plants, military bases, and the like are all expected to employ RFID tags for various applications.

A problem with RFID tags is determining where the tag is located relative to the RFID reader device. The interrogating radio waves emitted by the RFID reader are of course invisible, and so provide no indication to the user where the reader is scanning. This can cause confusion for the user when there are many RFID tags present, or when the user wants to scan for tags in a localized area, or when the user wants to identify a particular RFID tag among many.

Some RFID reader devices can electronically determine the location of an RFID tag. Typically, this is accomplished by triangulation, using the data generated from a plurality of networked RFID readers in different locations. A problem with electronic RFID tag location is that, even though the tag location may be known electronically, there is no way to indicate to the user the location of the tag.

Hence, there is a need for an RFID reader that can indicate to the user where the RFID reader is scanning, or indicate to the user the tag location.

SUMMARY

The present invention provides an RFID tag reader that uses a light beam to indicate to the RFID reader user where the RFID reader is scanning. The light beam is oriented and dimensioned (i.e. has a matching solid angle) to indicate the volume of space in which the RFID tag reader is scanning. For example, the light beam can overlap with an RF interrogating beam being emitted by the reader. Alternatively, the light beam can overlap with a volume of space that is discriminated for electronically (i.e. the RFID reader can electronically determine the tag location, and the RFID reader is programmed to only register tags within a volume of space overlapping with the light beam).

The present invention also provides an RFID reader that uses a light beam (e.g. a laser beam) to indicate the location of an RFID tag, or group of tags. In this embodiment, the RFID reader electronically determines the location of the RFID tag (e.g. in combination with a plurality of other, networked RFID readers each having its own antenna), and then indicates to the user the location of the RFID tag by directing the light beam at the tag. In this case, for example, the RFID tag can be illuminated with a visible laser beam.

DETAILED DESCRIPTION

The present invention provides an RFID tag reader that uses a light beam to indicate the physical location of a tag, or indicate the volume of physical space that the RFID reader is scanning. In a first embodiment, the RFID reader electronically determines the location of the RFID tag (e.g. by sharing and combining location data with a plurality of other RFID tag readers or antennas). Then, using this data, the RFID reader controls a laser scanner to direct a visible laser beam at the tag, so that a user can see where the tag is located. If several tags have been detected, then the user can select which tag the RFID reader will illuminate with the laser. In the second embodiment, the RFID reader emits a narrow interrogating RF beam, and a laser beam or light beam is oriented and dimensioned (i.e. the solid angle size is adjusted) to substantially overlap the RF beam. The RFID reader can only read tags located within the interrogating RF beam, and the light beam visually indicates where the RF beam is located, and therefore where the RFID reader is scanning and hence where a scanned tag is located. Alternatively, the RFID reader can electronically determine the located of a tag, and will only indicate on a display the tags that are located within the light beam, as determined by electronic location detection.

With the present invention, the user of the present RFID reader will gain visible location information about the location and identity of an RFID tag or group of tags. Also, the user will be able to scan a localized volume of space (e.g. a particular store shelf), and avoid detecting tags that are outside an area of interest. The RFID reader user will be able to easily see where the RFID reader is scanning. Additionally, when several tags are detected, the user will be able to visually determine the location of a particular tag. The present invention can provide these functions even if the tags are not visible (e.g. if the tags are located within a cardboard box or behind a wall).

Figure 1:
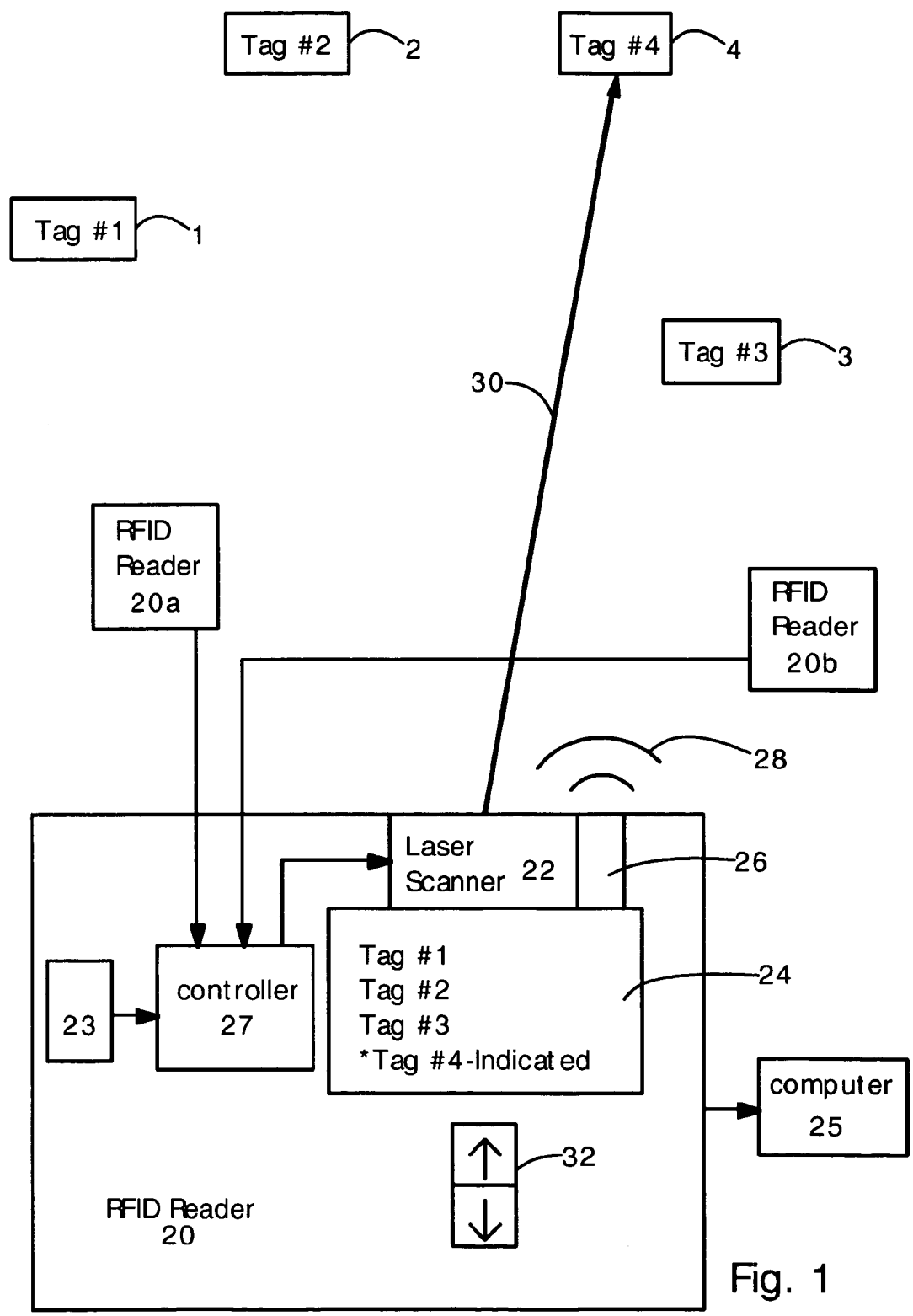
FIG. 1 shows the present RFID reader indicating a selected tag (Tag #4) with a laser beam. The location of the selected tag has been determined electronically.

FIG. 1 illustrates a first embodiment of the present invention. An RFID reader 20 comprises a laser scanner 22, a display 24 (e.g. liquid crystal display), keypad 32, receiving antenna 23, controller 27 and an RF transmitting antenna 28 for emitting interrogating RF energy 28. The RF energy 28 causes RFID tags (Tag #1, Tag #2, Tag #3, Tag #4) to emit an RF reply signal that is detected by the receiving antenna 23. The controller 27 is capable of electronically determining (or receiving electronic data indicating) the physical locations of the RFID tags 1 2 3 4. The RFID reader 20 may have several receiving antennas (in addition to antenna 23) for receiving RF reply signals from the tags 1 2 3 4. A plurality of receiving antennas allows for more accurate location detection.

In order to more accurately and rapidly determine the locations of the RFID tags 1 2 3 4, additional RFID readers 20a 20b can also be used. In this case, the RFID readers 20 20a 20b should be in data communication (e.g. wirelessly networked) so that location data from all the RFID readers 20 20a 20b can be combined (e.g. combined at the controller 27). Methods for electronic RFID tag location detection by combining data from multiple RFID readers (each typically having its own receiving antenna) are well known in the art. Also, it is noted that additional active RFID tags (known in the art as reference tags) can be used to more accurately determine the location of the RFID tags of interest.

The RFID reader 20 can be a handheld, manually operable device, or a stationary device with a fixed location. Alternatively, the RFID reader can lack the display 24, in which case the RFID tag data is displayed on another device in data communication with the RFID reader 20, such as a computer 25.

In operation, the RFID reader 20, either alone or in combination with the other RFID readers 20a 20b, detects the presence of the RFID tags 1 2 3 4, and receives data stored on the tags 1 2 3 4. Then, the controller 27, either alone or in combination with the other RFID readers 20a 20b, determines or receives electronic data indicating the physical location of one or more of the RFID tags 1 2 3 4. Then, the controller 27 controls the laser scanner 22 to direct a visible laser beam 30 at one (or more) of the RFID tags 1 2 3 4. In the particular example of FIG. 1, the visible laser beam 30 is directed at tag #4, and this is indicated on the display 24.

With the laser directed at and illuminating tag #4, the user of the RFID reader 20 will be able to visually see the location of tag #4. If tag #4 is located behind an opaque barrier, such as a cardboard box, or within a book, the laser will illuminate the box or book that contains tag #4. In this way, the user obtains visible information about the location of the indicated RFID tag.

If more than one tag is selected on the display, then the laser scanner 22 can control the laser beam 30 so that it rapidly alternates between the two tag locations.

Figure 2:
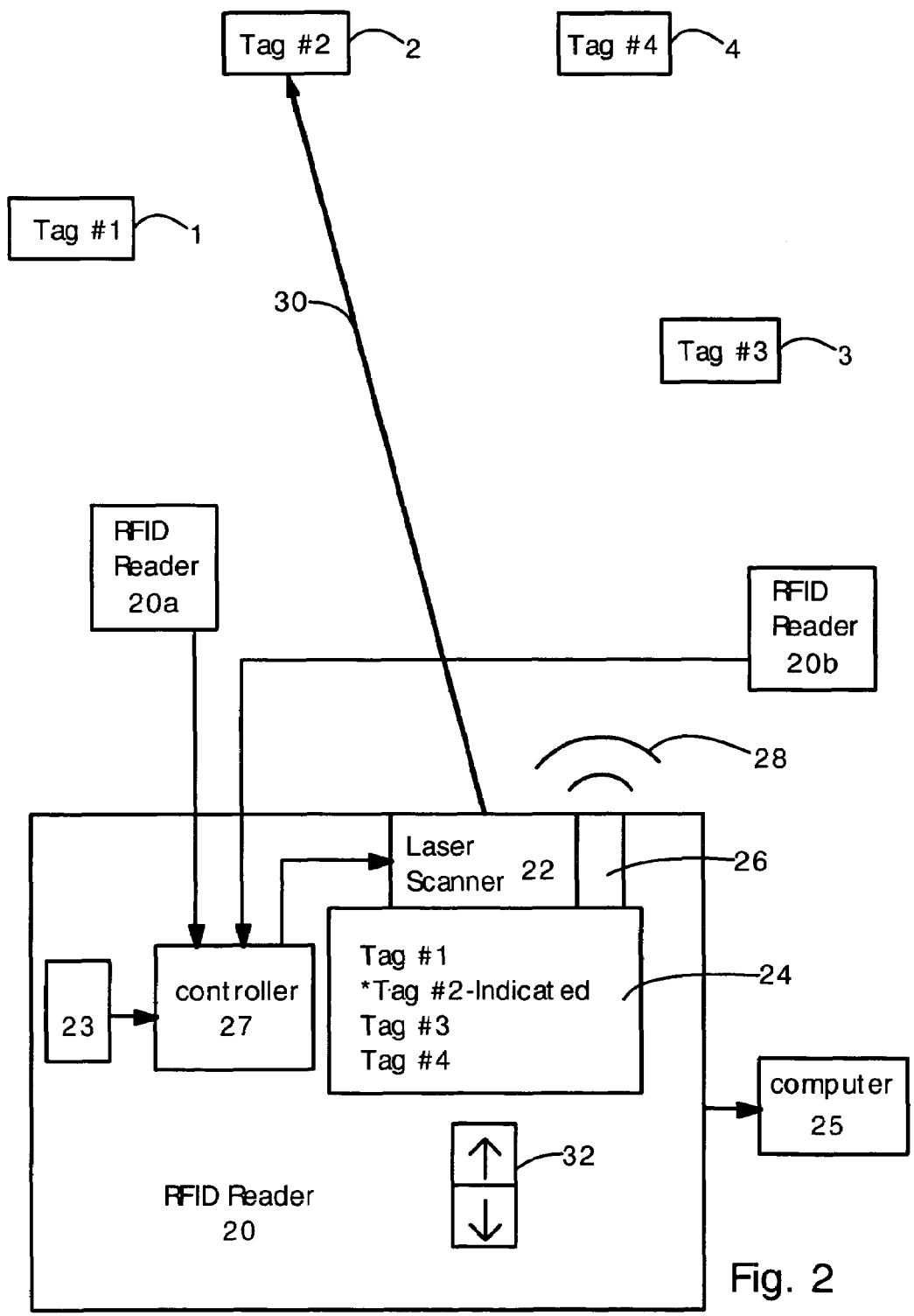
FIG. 2 shows the present RFID reader indicating a selected tag (Tag #2) with a laser beam. The location of the selected tag has been determined electronically.

If the user desires to know the location of a specific tag, it can be selected on the display by using the keypad 32. For example, pressing the top button on the keypad twice will cause tag #2 to be selected, which will result in the visible laser beam 30 being redirected to point towards tag #2 . In FIG. 2, tag #2 has been selected. With this feature, the user will be able to easily and rapidly see the locations of all the tags of interest. The user can toggle between the tags listed on the display, and the laser beam 30 will be scanned so that it always points at the tag selected on the display 24.

It is important to note that the location of the RFID tags 1 2 3 4 might not be accurately determined in some situations. For example, radiofrequency interference or noise, intense multipath signals, or an insufficient number of antennas can make it difficult to accurately determine the locations of the RFID tags. In this case, the laser beam 30 can be oscillated (e.g. in a circular pattern, creating a cone) to indicate the approximate most likely area of the RFID tag location. The size of the area can be determined from the noise level present in the area, or the number of other RFID readers (i.e. readers 20a 20b) that are providing location data to the RFID reader 20. For example, if the environment has a high level of noise, and few other RFID readers are participating in RFID tag location detection, then the laser beam 30 can trace out a large area, indicating that the RFID tags 1 2 3 4 have a very uncertain location.

Also, it is noted that the RFID tag location can be determined by any electronic method that does not rely on the laser beam for location determination (e.g. light activated RFID tags). For example, in the present invention, the RFID tags can be electronically located by triangulation using several antennas, or by using a single antenna with a narrow, scanned interrogating RF beam, or by using other electronic techniques. A single, narrow RF beam can be used to determine the RFID tag location by simply correlating the timing of the RF reply signal with the RF beam direction. The present invention can be used with any electronic method for determining the RFID tag location. Any electronic method for RFID tag location will provide data useable by the controller 27 for targeting the laser beam 30.

Alternatively, the laser scanner 22 can be replaced with another visible light source, such as a focused beam from a light emitting diode (LED) or other light source. Also, the light source can be defocused such that the size (i.e. solid angle) of the light beam indicates the approximate uncertainty in the RFID tag location.

Also, it is noted that the laser scanner 22 can function as a bar code reader. Combination bar code/RFID readers are well known in the art. The keypad 32 can be used to select the desired function of the laser scanner 22.

It is noted that the tags 1 2 3 4 can be active or passive RFID tags. Active tags are typically easier to locate and have a longer range because they carry their own power source and can provide a stronger RF reply signal. Active and passive RFID tags are well known in the art.

Additionally, it is noted that the present RFID reader can be used to find a specific, desired tag, provided that an identification number of the desired tag is known. This can be useful in situations where a large number of tags (e.g. hundreds or thousands) are present. In this application, the identification number of the desired tag is entered into the RFID reader, or selected on the display. The RFID reader then interrogates all the tags within range, and determines if the desired tag is present. If the desired tag is present, then its position is determined electronically, and the visible laser beam 30 is directed toward the desired tag. In this way, the present RFID reader can be used to find a particular box, book or piece of equipment in a warehouse, library or manufacturing plant.

Additionally, it is noted that, if the RFID reader 20 is handheld, then the laser beam 30 may become misdirected if the reader is tilted or moved. In order to compensate for manual movement of the RFID reader 20, the reader 20 may include accelerometers to detect movement of the RFID reader and the orientation of the reader with respect to gravity. With the absolute orientation of the RFID reader detected by on-board accelerometers, the laser scanner 22 can be controlled to compensate for tilting motion and movement of the RFID reader after the tag location has been determined electronically. In this way, the laser beam can remain targeted on the selected RFID tag even if the RFID reader is moved or tilted. Alternatively, the locations of the RFID tags can be rapidly updated so that the laser beam 30 is frequently repositioned.

Figure 3:
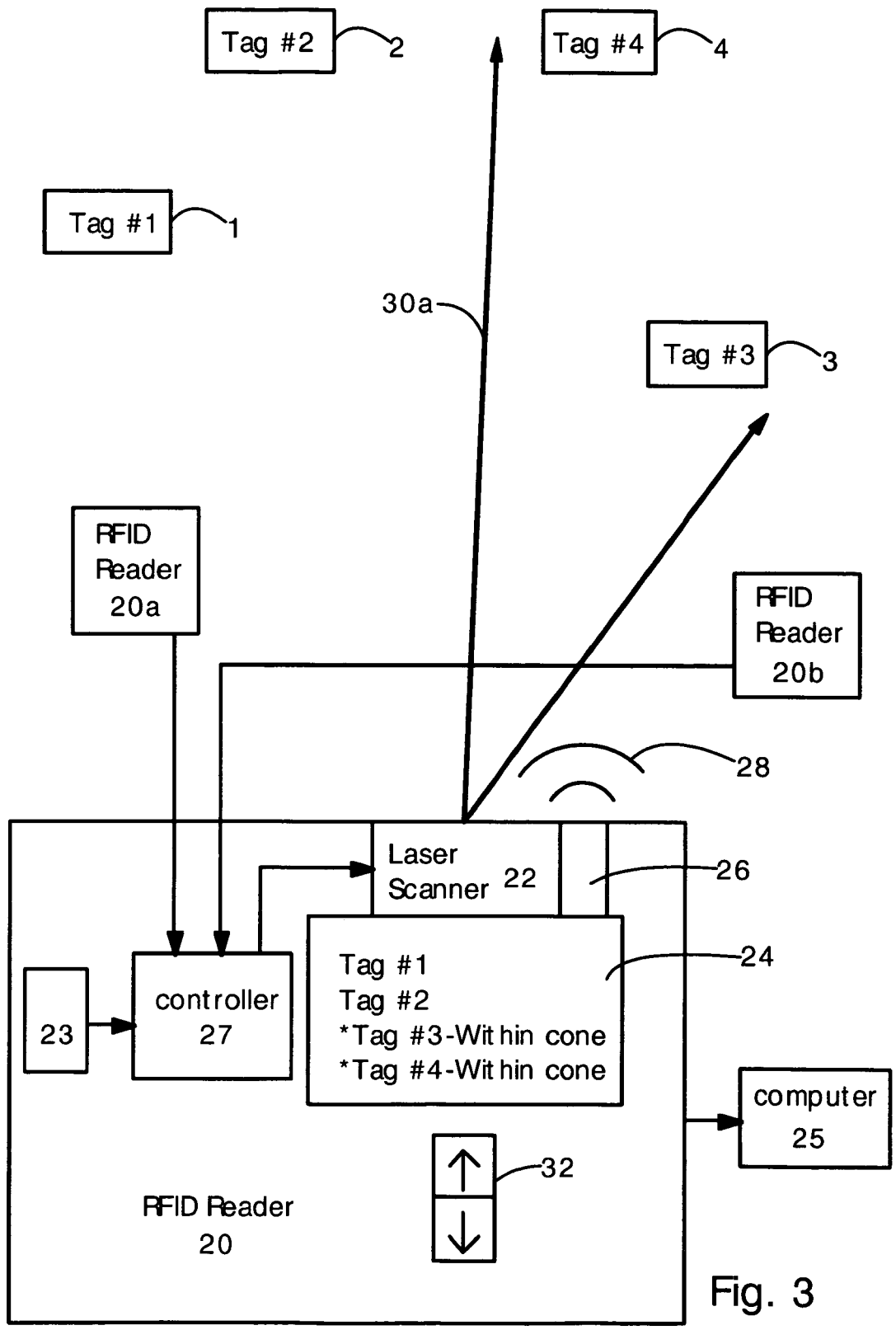
FIG. 3 shows the present RFID reader indicating with a laser cone a detection volume. Tags within the laser cone are indicated on the display.

FIG. 3 illustrates another use of the present invention in which the laser scanner 22 is used to indicate a volume or boundary. In the specific example of FIG. 3, the laser beam is controlled to create a laser cone 30*a*. The RFID tag reader 20 indicates on the display which tags are inside the cone 30*a* (tags 3 and 4), and which tags are outside the cone. The size of the cone can be selected with the keypad 32, for example.

Alternatively, the laser scanner can be used to create a laser sheet (now shown) by rapidly oscillating the laser beam. The RFID reader can indicate on the display 24 which tags are to the left side, and which tags are to the right side (or above and below) the laser sheet.

Figure 4:
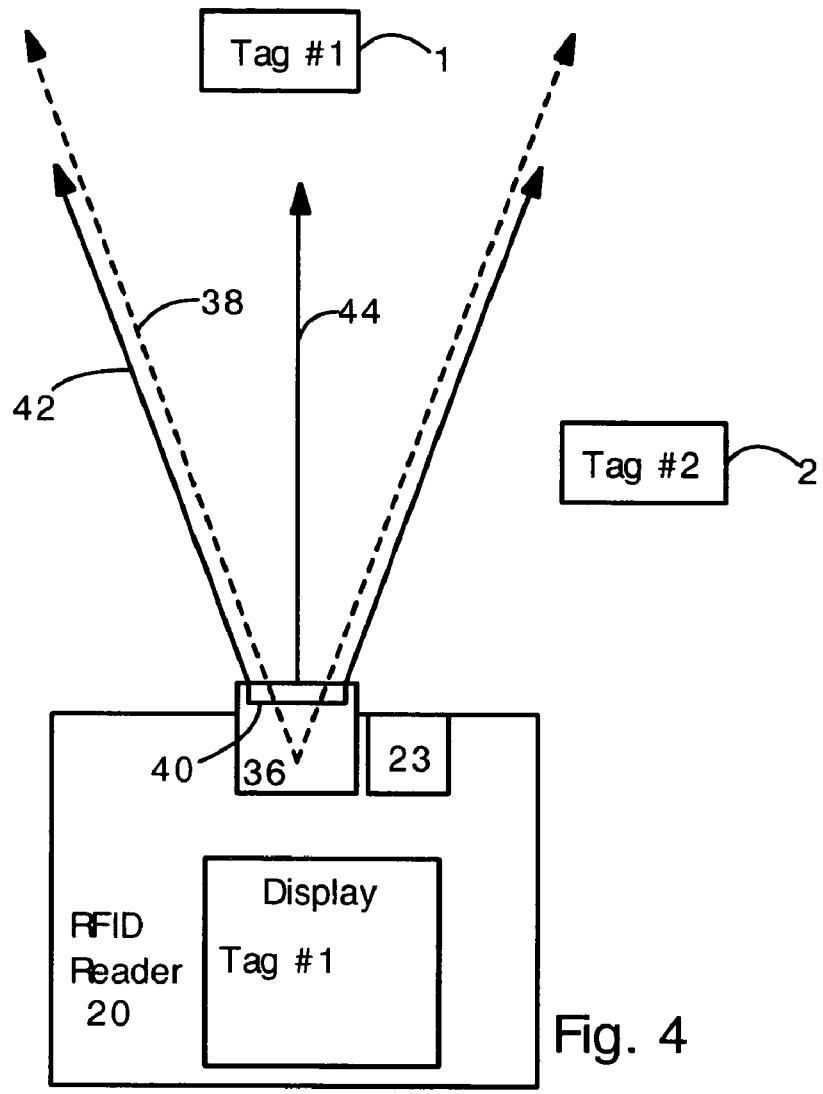
FIG. 4 shows an embodiment of the invention in which the RF interrogation beam is directional (e.g. having a solid angle less than 1.5 or 1 steradian with greater than 50% of the emitted RF energy). A light beam overlaps the RF beam, so the user can see where the RFID reader can detect RFID tags.

FIG. 4 illustrates another aspect of the present invention in which the RFID tag reader 20 has a transmitting antenna 36 for emitting a narrow interrogating RF beam 38. The beam 38 is directional, and has a limited solid angle. The volume (e.g. solid angle and range) in which the RFID reader can detect tags will of course depend upon the sensitivity of the RFID tags and power of the RF beam 38 as well as the solid angle of the beam 38. More than 50% of the emitted RF energy can be can be confined to a solid angle of less than about $1.5\pi$, $1\pi$, or $0.5\pi$ steradians, for example.

In the present invention, a light source 40 is provided. The light source 40 can be a laser or LED, for example. The light source 40 provides a visible light beam 42 that substantially overlaps with the RF beam 38, and thereby indicates the volume within which the RFID reader can detect tags. The light beam visually indicates the approximate boundary of the RF beam 38 (i.e. the boundary at which the RF beam has just enough power to detect a RFID tag). If the light source is a laser or laser scanner, the laser can trace out a cone shape (or other shape) that indicates the size and shape of the RF beam.

In operation, in the specific example of FIG. 4, tag #1 is located within the RF beam and within the light beam 42. Tag #1 is illuminated by the light beam 42, which indicates to the user that it is within the RF beam 38 and can therefore be detected by the RFID reader 20. Tag #2 is outside the light beam 42 and RF beam 38 and therefore cannot be detected.

With the present invention, a user of the RFID tag reader will be able to easily see where the RFID tag reader is detecting tags, and where it is not detecting tags. Hence, if desired, the user will be able to use the RFID tag reader to determine the location of an RFID tag, and determine if any RFID tags are located within a particular localized area. Also, the user will be able to detect only tags within a limited area of interest, such as a particular retail store shelf or within a particular box.

To provide additional spatial discrimination against tags located outside the light beam 42, the receiving antenna 23 can also be directional.

Also, the light beam 42 can be operated so that it is ON when the RFID reader is emitting the interrogating RF beam and attempting to detect tags. This will indicate to the user when the RFID reader is scanning for tags. Since the interrogating RF beam is typically ON for a short duration (e.g. 30 or 50 milliseconds or less), the light beam 42 can be pulsed for a longer duration (e.g. 0.5 seconds or 1 second) so that it is more apparent that the RFID reader is scanning for tags). The interrogating RF beam 38 and light beam 42 can be under manual control.

Additionally, the present RFID reader may include a bright laser beam 44 to indicate a center of the RF interrogating beam, where the energy density of the RF interrogating beam is greatest. This will allow the user to accurately target the RF beam when the RFID tag location is known.

The directional RF beam 38 can be created by many different kinds of antennas or antenna assemblies (e.g. an antenna in combination with a conductive or RF-absorptive plate that blocks RF emission in unwanted directions). For example, the directional antenna can be a yagi antenna, a well known and commonly used directional antenna. Other directional antennas that can be used include panel arrays, or patch antennas.

Figure 5:
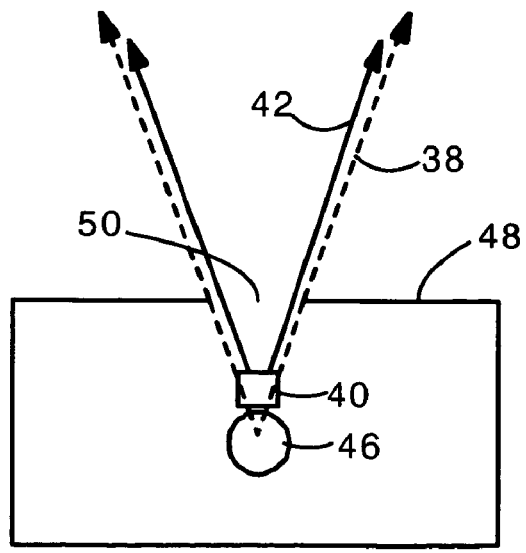
FIG. 5 shows a closeup view of a light emitter and RF beam antenna. The antenna comprises a wide-angle dipole antenna disposed behind a conductive barrier with an aperture.

Since directional antennas can be large in size, it may be beneficial to limit the solid angle of the interrogating RF beam 38 by using a conductive or RF absorptive sheet with an aperture. FIG. 5, for example, shows a particular antenna assembly comprising a wide angle antenna 46 (e.g. a dipole antenna) disposed within a conductive or RF-absorptive box 48. The box has an aperture 50 that allows the relatively narrow interrogating RF beam 38 to escape. The box also contains the light source 40. Although this design is wasteful of RF power, it provides an inexpensive and compact way to provide the narrow interrogating RF beam 38.

The solid angle of the light beam can be selected or adjusted in accordance with the output power of the RF beam 38. Typically, the RFID reader will be able to detect RFID tags over a wider area (i.e. the solid angle size of beam 38 will become greater) with increasing output power. Hence, in order for the light beam 42 to accurately indicate the RFID tag detection area, the light beam 42 should have a larger solid angle for high RF output power.

The present invention provides RFID reader devices that visually indicate the location of an RFID tag or location where the RFID reader is scanning. This will make RFID readers more useful because it will allow user to find hidden RFID tags, and search selected areas for RFID tags. The present RFID readers are particularly useful for inventory control.

It will be clear to one skilled in the art that the above embodiment may be altered in many ways without departing from the scope of the invention. Accordingly, the scope of the invention should be determined by the following claims and their legal equivalents.

What is claimed is:

1. An RFID tag reader, comprising:
   a) a visible light beam scanner;
   b) a controller for electronically determining or receiving electronic data indicating a location of an RFID tag, wherein the controller is operable for controlling the visible light beam scanner to direct a light beam toward an electronically determined location of the RFID tag.

2. The RFID tag reader of claim 1, wherein the controller receives RFID tag location data from a plurality of antennas.

3. The RFID tag reader of claim 1, wherein the visible light beam scanner is operable as a bar code scanner.

4. The RFID tag reader of claim 1 further comprising a display operable for indicating a single specific tag among a plurality of tags, wherein the indicated single specific tag is targeted with the visible light beam.

5. The RFID tag reader of claim 1 wherein the RFID tag is not a light activated tag.

6. The RFID tag reader of claim 1 wherein the visible light scanner is operable to illuminate an area having a solid angle indicative of a location uncertainty of the electronically determined location of the RFID tag.

7. A method for visually indicating a location of an RFID tag, comprising the steps of:
   a) electronically determining a location of the RFID tag;
   b) controlling a visible light beam scanner to direct a visible light beam toward the electronically determined location of the RFID tag.

8. The method of claim 7, further comprising the step of adjusting a solid angle size of the light beam to indicate a location uncertainty of the RFID tag.

9. An RFID tag reader, comprising:
   a) a transmitting antenna for emitting a directional interrogating RF beam for interrogating an RFID tag;
   b) a visible light beam source, wherein the visible light beam source produces a visible light beam that substantially overlaps the directional interrogating RF beam.

10. The RFID tag reader of claim 9 wherein the visible light beam source is operable to turn ON when the transmitting antenna is emitting the directional interrogating RF beam.

11. The RFID tag reader of claim 9 further comprising a conductive or RF-absorptive sheet with an aperture for rendering the RF beam more directional.

12. The RFID tag reader of claim 9 wherein more than 50% of the energy of the directional interrogating RF beam is confined to a solid angle of less than $1.5\pi$ steradians.

13. The RFID tag reader of claim 9 wherein more than 50% of the energy of the directional interrogating RF beam is confined to a solid angle of less than $0.5\pi$ steradians.

14. The RFID reader of claim 9 further comprising a laser beam that indicates where the directional interrogating RF beam has the greatest energy density.

* * * * *